United States Patent [19]

Gruner

[11] Patent Number: 4,498,337

[45] Date of Patent: Feb. 12, 1985

[54] TEMPERATURE SENSOR FOR DETERMINING MASS TRANSFER RATE AND/OR TEMPERATURE RATE OF A FLOWING MEDIUM

[75] Inventor: Heiko Gruner, Gerlingen, Fed. Rep. of Germany

[73] Assignee: Robert Bosch GmbH, Stuttgart, Fed. Rep. of Germany

[21] Appl. No.: 470,270

[22] Filed: Feb. 28, 1983

[30] Foreign Application Priority Data

Mar. 6, 1982 [DE] Fed. Rep. of Germany ....... 3208096

[51] Int. Cl.$^3$ ............................ G01F 1/68; G01K 7/16
[52] U.S. Cl. ........................................ 73/204; 338/25; 374/185
[58] Field of Search ................. 73/118 A, 204; 338/25, 338/308, 309, 320; 374/185

[56] References Cited

U.S. PATENT DOCUMENTS

| | | | |
|---|---|---|---|
| 3,315,200 | 4/1967 | Hannay | 338/25 |
| 3,435,400 | 3/1969 | Beckman | 73/204 |
| 3,995,249 | 11/1976 | Ferry | 338/309 |
| 4,345,465 | 8/1982 | Gruner et al. | 73/204 |
| 4,399,697 | 8/1983 | Kohama et al. | 73/204 |

FOREIGN PATENT DOCUMENTS 21291 6/1980 European Pat. Off. .

OTHER PUBLICATIONS

Malin et al., "Mass Flow Meter" in IBM Tech. Disclosure Bulletin, vol. 21, #8, 1/79, p. 3227.

Primary Examiner—Herbert Goldstein
Attorney, Agent, or Firm—Frishauf, Holtz, Goodman & Woodward

[57] ABSTRACT

A thin tantalum foil is sufficiently stable mechanically for supporting a bridge of thin film resistors with a glass insulating layer interposed between them and the foil, while a fluid medium flows past the resistors for measurement of its temperature or for thermal measurement of the rate of flow of the mass of the medium. The resistors form a bridge one half of which is heated to maintain a predetermined temperature for measurement of the rate of flow by means of the heating current, while the other half provides a reference for the regulation of the heating current. A slot in the metal foil between the halves of the bridge provides thermal decoupling between the heated and unheated parts of the bridge.

18 Claims, 7 Drawing Figures

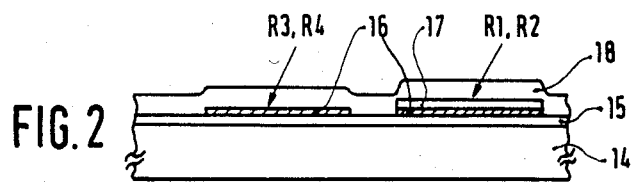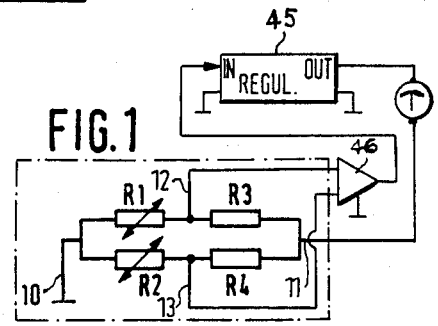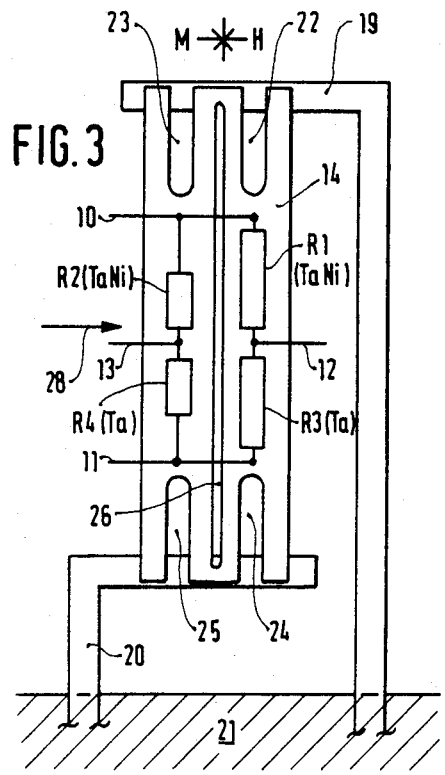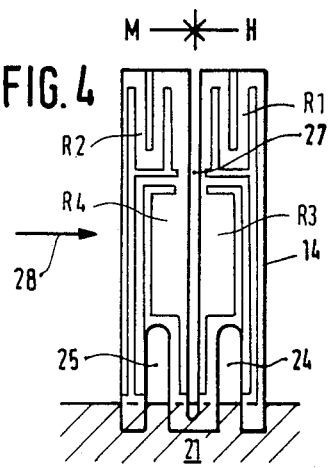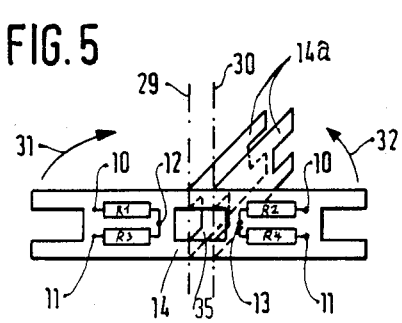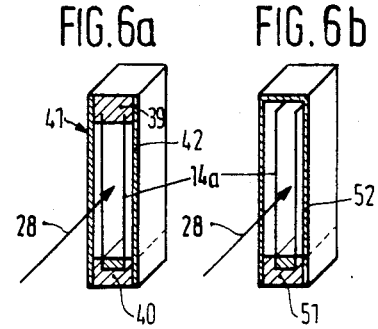

TEMPERATURE SENSOR FOR DETERMINING MASS TRANSFER RATE AND/OR TEMPERATURE RATE OF A FLOWING MEDIUM

This invention concerns a sensor for use in a flowing medium having a temperature-sensitive thin film resistance circuit on a carrier. Such a sensor used as a throughput measuring device is known from published European patent application No. EP-A1 21 291. A sensor is there described past which a medium flows along two temperature dependent resistances constituted as thin resistance layers, one of these serving as the measuring resistance and the second as a heating resistance. The cooling of the heated resistance and therefore the necessary current for heating it back up, are a measure for the quantity rate of flow of the medium. The carrier for this known sensor is a frame on which is stretched a foil carrying the resistances. In the region of the resistances, the frame has cut-outs, so that in this region the foil alone is effective as carrier. Such a configuration has, as a whole, a high heat capacity, because the frame must also be drawn into the heat balance. The sensor follows temperature changes first very rapidly. Thereafter, however, the temperature difference with respect to the frame becomes noticeable and the temperature change accordingly then runs relatively slowly compared to the first rapid response. In that disclosure a plastic foil is suggested for supporting the resistors.

THE INVENTION

It is an object of this invention to provide a sensor for use in a flowing liquid which will have high mechanical stability and produce little delay in the effects of temperature during measurement.

Briefly, the carrier is in the form of a metal foil or a thin strip which has a coating of an electrically insulating layer on which the resistance array connected in circuit is applied.

Metals possess a good heat conductivity and the surface of the carrier can be practically completely utilized for the provision thereon of the array of resistors, so that no unused excess material is provided. A metallic carrier has at the same time good elastic properties and high strength, which noticeably increases the service life of the device in a flowing medium. Only a very slight thickness of the carrier needs to be provided, so that considerably advantages compared to known arrangements of interest in this connection are obtained.

It is particularly advantageous to constitute the overall design of the sensor in such a way that at least two temperature-sensitive resistors are disposed on the carrier. These can be very effectively decoupled thermally with respect to each other by the provision of a slot in the metal sheet, which practically entirely excludes mutual influence of the resistor temperatures. A common disposition of temperature-sensitive and temperature-independent resistors on the carrier is particularly practical if the various resistance units are made of the same material, particularly of the same material layers. Such an arrangement can advantageously be so constituted that the temperature-sensitive resistances consists of a two-layer system in which a nickel layer overlies a tantalum layer, whereas the temperature-independent resistances have a layer system of only tantalum. In such an arrangement the temperature-independent resistances can be very simply produced by etching away the nickel layer lying above the tantalum. Furthermore, both resistance arrays can be trimmed or balanced in the same way by means of a laser ray.

With regard to the reduction of the heat capacity of the sensor, it has been found desirable to provide cut-outs in the region of the casing or mounting. In this manner the heat transferred to the casing is considerably reduced and at the same time the response speed of the sensor is further raised. With respect to the response speed of the sensor, the accessibility of the resistances to the flowing medium is decisive and a uniform and essentially laminar flow is particularly advantageous. Such flow conditions can be very simply and practically obtained when the carrier is bent into U-shape and a channel is provided on its inner side for the flowing medium, to which the resistances are exposed.

Tantalum has been found particularly effective as the material for the metal strip that acts as the carrier for the sensor.

Because of its material properties, even very thin titanium sheets—i.e., titanium foil—are mechanically very stable. For example, a titanium foil 50 $\mu$m thick is entirely practical for the purpose. Consequently, the carrier may be referred to as a metal "foil" without in this context connoting any readiness to flap or crumple. The term metal "leaf" is also descriptive of the carrier.

The density of titanium amounts to only 4.5 kg per cubic decimeter. Its average specific heat capacity is 0.47 kilo Joules per kg per °K. Consequently, the product of density and specific heat capacity which is decisive for the heat capacity of a sensor in the above-described form takes on a low value when a titanium foil provides the carrier.

When the resistances are arranged in a bridge, as is particularly desirable, the configuration of the sensor according to the present invention assures that the four resistors of the bridge are trimmed to balance and mechanically coupled and cannot be interchanged.

BRIEF DESCRIPTION OF THE DRAWINGS

The invention is further described by way of illustrative example with reference to the annexed drawings, in which:

FIG. 1 is a circuit diagram of the electrical circuit of the sensor;

FIG 2 is a schematic cross-section through a sensor having a temperature-sensitive resistor and a temperature-independent resistor;

FIG. 3 is a schematic plan view with a circuit diagram of a sensor held in tension between its two ends;

FIG. 4 is a schematic plan view of a sensor clamped at one end;

FIG. 5 is a diagram showing the manufacture of a U-shaped sensor;

FIG. 6(*a*) shows the insertion of a sensor clamped at both ends into a casing or pipe, and FIG. 6(*b*) shows the insertion of a sensor clamped at one end into a casing or pipe;

DESCRIPTION OF THE ILLUSTRATED EMBODIMENTS

FIG. 1 shows an electrical bridge circuit having four connection leads 10, 11, 12 and 13, forming a sensor for determining the mass transfer rate or the temperature of a flowing medium. The bridge contains temperature-sensitive resistors R1 and R2 as well as temperature-independent resistors R3 and R4. The connections 12 and 13, each between one temperature-sensitive resistor and one temperature-independent resistor are brought, for determination of the mass flow of a flowing medium to a regulating circuit 45, preferably through a differential 46, so that the regulating circuit can control the heating current of the resistance array through the connections 10 and 11. The resistors R1 and R3 have higher resistance and their heating is negligible. Such a measurement circuit is described in above cited EPA No. 0221291.

For determination of the mass of the flowing medium, the temperature-independent resistance is thereby heated up whenever the cooling of the resistance R1 increases because of an increase of flow rate. The magnitude of the heating current thus becomes a measure for the flowing medium. Further details of the measuring set-up need not be further described here, since they are well known.

One of the two temperature-sensitive resistors R1 or R2 can be used alone for temperature measurement of a flowing medium. The described arrangement offers, along with the use as a measuring bridge, the possibility of the use of a single measuring resistance for rapid temperature determination.

FIG. 2 shows a section through the sensor, with the temperature-sensitive resistors R1 and R2 and the temperature-independent resistors R3 and R4. The carrier of the sensor is designated 14 and consists of a metal leaf, particularly a titanium foil. The carrier has a thickness between 25 $\mu$m and 125 $\mu$m according to the mechanical stress and requirements regarding the reaction time of the sensor. As a rule it has a thickness of about 100 $\mu$m, which provide very good thermal properties at high mechanical strength.

On top of the carrier 14 is a coating of an electrically insulating layer 15, which preferably consists of a glass layer. On this insulating layer 15 the resistance array with the resistors R1 to R4 is applied by thin film technology, in FIG. 2 16 designates a tantalum structure and 17 a nickel structure. The tantalum structure 16 forms the temperature-independent resistors R3 and R4, whereas the double layer of tantalum and nickel forms the temperature-sensitive resistors R1 and R2. On top of the resistances and the insulation layer there lies yet another layer, a protective layer 18 which can for example be a hydrophobic layer of a mica-bearing polymer. The illustrated thickness relations do not agree with reality but are modified for reasons of illustration. The carrier 14 has a thickness in the order of magnitude of 50 to 100 $\mu$m, the insulation a thickness of about 10 $\mu$m, the thickness of the tantalum resistance layer is about 0.05 $\mu$m, that of the TaNi layer about 0.25 $\mu$m and the protective layer 18 again has a thickness in the order of magnitude of 5 $\mu$m.

FIG. 3 shows schematically the configuration of a sensor for determining the mass transfer rate in a flowing medium. The sensor has resistors R1, R2, R3 and R4 connected and physically disposed in a manner shown in FIG. 1. The resistors R1 to R4 are schematically shown. In reality they cover practically the entire surface of the carrier 14. The electrical connections of the measuring bridge are designated 10 to 13 corresponding to FIG. 1 and are correspondingly connected in circuit. The carrier 14 is held at both ends in housing brackets 19 and 20 which in turn are seated in a structural component 21. At the clamped ends of the carrier 14 four cutouts 22-25 are made in the carrier 14 corresponding in position to the individual resistances R1 to R4 respectively located near the inner ends of the cutouts. In consequence, the carrier makes contact with the housing parts 19 and 20 only with relatively small area contacts, as the result of which only little heat is given off to the housing. The thermal decoupling of the resistances R1 and R3 against the resistances R2 and R4 is produced by a slot 26 in the carrier 14 which practically excludes mutual thermal influence between the two halves of the bridge. The carrier 14 is subdivided into two regions by the slot 26, which are both exposed to the flowing medium of which the moving mass is to be determined. As the result of the thermal decoupling produced by the slot 26, the temperature of the resistor R1 and accordingly its resistance value can be regulated corresponding to the cooling effect of the flowing medium, without influencing the likewise temperature-sensitive comparison resistor R2 by the heating provided to the resistor R1. The carrier 14 is thus longitudinally subdivided into a heating branch H and a measuring branch M, as indicated at the upper end of the carrier by the letters H and M.

The arrangement according to FIG. 4 corresponds to a great extent to that of FIG. 3, for which reason few details are drawn in. The same parts are designated with the same reference numerals. The difference between the arrangement of FIG. 4 from that of FIG. 3 consists in that the carrier 14 is held only at one end of the structural component 21, so that the drawing away of heat to the casing from the upper region of the sensor which carries the temperature-sensitive resistors is practically completely prevented. In this arrangement, a slot 27 open at one end can be provided. The direction of flow of the medium is shown by the arrow 28 in the same manner as in FIG. 3. FIG. 4 also shows schematically one configuration of resistors and leads for practically completely covering the carrier 14 with the electrical circuit, avoiding any unused excess of carrier material. In this case the temperature-sensitive resistors are made in meander-shape and the temperature-independent resistors are made as simple strips, this being shown merely to illustrate the range of possibilities in the practice of the invention.

In FIGS. 5 and 6, as in the figures just discussed, equivalent parts are again designated with the same reference numerals as in the preceding figures.

FIG. 5 shows a disposition of the resistors different from that of FIG. 3, with R1 and R3 at one end of the carrier 14 and R2 and R4 at the other end of the carrier 14. A central aperture 35 is provided to perform the function of the slot 26. The sides of the aperture 35 are bent twice at right angles along the lines 29 and 30 to produce a U-shaped device as shown by the legs 14a of the bent-over carrier. The arrows 31 and 32 indicated how the carrier 14 is bent to form the U-shaped device 14a. Although the resistors are R1-R4 are shown as if they were on the outside of the bentover foil, that is merely for simplifcation of the drawing and in fact in the preferred embodiment, they are located on the backside of the carrier 14 of FIG. 5, so that after the bending over at right angles along the lines 29 and 30 the resistors will be on the inside surface of the two legs of the U. The device in FIG. 5 may be held at both ends as shown in FIG. 6(a) or at only end, as shown in FIG. 6(b) and, in case of FIG. 6(b) it is not material whether the closed or the open end of the U is the one that is mounted in the mounting support 51.

In FIG. 6a, the mounting supports 39 and 40 together with the plates 42 form a rectangular duct through which the medium flows as shown by the arrow 28. Likewise in FIG. 6b the duct walls 52 together with the support wall 51 complete a duct for the flow medium. Of course a portion of the duct containing the sensor shown in these figures may be part of or interposed in a longer duct through which the medium flows. The configurations of FIG. 6a and FIG. 6b are suitable for supporting a laminar flow of the fluid to be measured, leading to favorable, reproducible results.

Although the invention has been described with reference to a number of illustrative embodiments, it will be understood that further variations and modifications are possible within the inventive concept.

I claim:

1. Sensor apparatus for measuring temperature or for thermally measuring rate of flow, in a flowing medium, comprising:

means for supporting a metal foil in a flowing medium in a position in which said medium may flow along the surface of said foil in contact with at least one surface thereof;

a metal foil held in said support means for exposing the surfaces of said foil for heat exchange with said medium, said foil having a stiffness sufficient for providing mechanical stability during exposure to flow of said medium at least up to a predetermined rate of flow thereof;

an electrically insulating layer on said at least one surface of said foil;

a plurality of resistors respectively constituted as patches of thin electrically resistant layers on said insulating layer, said resistors including at least one pair of resistors having a single common connection and also including two resistors having resistances which vary with temperature, one of which is connected in a circuit for heating said last-mentioned resistor to a regulated extent;

connection means on said insulating layer for connecting the respective terminals of said resistors to connection conductors leading to an external measuring circuit;

said resistors and connection means substantially covering said at least one surface of said foil, and said foil and said supporting means being of a configuration providing for thermal decoupling from each other of said two resistors of resistance that varies with temperature, by virtue of a subdivision (26, 27) of said foil (14, 14a).

2. Sensor apparatus according to claim 1, in which said subdivision of said foil is provided by a slot in said foil located between said two resistors of resistance that varies with temperature.

3. Sensor apparatus according to claim 1, in which said resistors also comprise two resistors having resistance substantially invariant with temperature for a predetermined range of temperature.

4. Sensor apparatus according to claim 3, in which said resistors of resistance subject to variation which temperature are constituted by a two-layer system having a tantalum layer on said insulating layer and a nickel layer lying on said tantalum layer, and in which said resistors of resistance substantially invariant with temperature are constituted only by a layer of tantalum on said insulating layer.

5. Sensor apparatus according to claim 4 in which said resistors are connected in a bridge circuit having two branches each forming half of said bridge, each said branch including one of said resistors of resistance subject to variation with temperature and one resistor of resistance substantially invariant with temperature, one of said branches said one resistor having resistance which varies with temperature which is in said circuit for heating the same, the other resistor of the same branch also being connected in said heating circuit, and in which said subdivision of said foil for thermal decoupling is constituted by a slot separating the resistors of said respective branches of said bridge circuit.

6. Sensor apparatus according to claim 5, in which said subdivision of said foil includes at least one cutout in the region where said foil is held on said supporting means.

7. Sensor apparatus according to claim 6, in which said foil is held in said supporting means at only one end or side thereof.

8. Sensor apparatus according to claim 4, in which said foil is bent over into U-shape and in which said resistors are provided on the surface of said foil which is the interior surface of said U.

9. Sensor apparatus according to claim 3, in which said resistors are connected in a bridge circuit having two branches each forming half of said bridge circuit, each said branch including one of said resistors of resistance subject to variation with temperature and one resistor of resistance substantially invariant with temperature, one of said branches including said one resistor having resistance which varies with temperature which is in said circuit for heating the same, the other resistor of the same branch being connected in said heating circuit, and in which said subdivision of said foil for thermal decoupling is constituted by a slot separating the resistors of said respective branches of said bridge circuit.

10. Sensor apparatus according to claim 9, in which said subdivision of said foil includes at least one cutout in the region where said foil is held on said supporting means.

11. Sensor apparatus according to claim 10, in which said foil is held in said supporting means at only one end or side thereof.

12. Sensor apparatus according to claim 1, in which said subdivision of said foil includes at least one cutout in the region where said foil is held on said supporting means.

13. Sensor apparatus according to claim 12, in which said foil is held in said supporting means at only one end or side thereof.

14. Sensor apparatus according to claim 1, in which said foil is bent over into U-shape and in which said resistors are provided on the surface of said foil which is the interior surface of said U.

15. Sensor apparatus according to claim 1, in which said metal foil has a thickness of between 25 and 125 $\mu$m.

16. Sensor apparatus according to claim 15, in which said metal foil consists essentially of tantalum.

17. Sensor apparatus according to claim 1, in which said insulating layer consists essentially of glass.

18. Sensor apparatus according to claim 1, in which a protective layer is provided which covers said resistors as well as the remainder of said at least one surface of said foil.

* * * * *